US009158314B2

(12) United States Patent
Kung et al.

(10) Patent No.: US 9,158,314 B2
(45) Date of Patent: Oct. 13, 2015

(54) VOLTAGE REGULATOR, AND CONTROL CIRCUIT AND CONTROL METHOD THEREOF

(71) Applicants: Nien-Hui Kung, HsinChu (TW); Wei-Chung Chang, Zhongli (TW)

(72) Inventors: Nien-Hui Kung, HsinChu (TW); Wei-Chung Chang, Zhongli (TW)

(73) Assignee: RICHTEK TECHNOLOGY CORPORATION, Chupei, Hsin-Chu (TW)

( * ) Notice: Subject to any disclaimer, the term of this patent is extended or adjusted under 35 U.S.C. 154(b) by 366 days.

(21) Appl. No.: 13/737,821

(22) Filed: Jan. 9, 2013

(65) Prior Publication Data

US 2014/0191742 A1    Jul. 10, 2014

(51) Int. Cl.
*G05F 1/10* (2006.01)

(52) U.S. Cl.
CPC ..................................... *G05F 1/10* (2013.01)

(58) Field of Classification Search
CPC .......... H02M 3/156; H02M 3/158; G05F 1/10
USPC ........................................ 323/282, 284–285
See application file for complete search history.

(56) References Cited

U.S. PATENT DOCUMENTS

| 8,787,040 B2 | 7/2014 | Huang et al. | |
|---|---|---|---|
| 2004/0207375 A1* | 10/2004 | Umemoto et al. | 323/282 |
| 2006/0119338 A1* | 6/2006 | Soch | H02M 3/156 323/283 |
| 2007/0279024 A1* | 12/2007 | Falvey et al. | H02M 3/158 323/280 |
| 2010/0231190 A1* | 9/2010 | Falvey et al. | 323/284 |

* cited by examiner

*Primary Examiner* — Jue Zhang
(74) *Attorney, Agent, or Firm* — Tung & Associates

(57) ABSTRACT

The present invention discloses a method for controlling a voltage regulator, including steps of: converting an input voltage to an output voltage and providing an output current; sensing the output current; reducing the output voltage; and when the reduction of the output voltage causes the output current to change, setting the output voltage back to a value which does not change the output current.

8 Claims, 7 Drawing Sheets

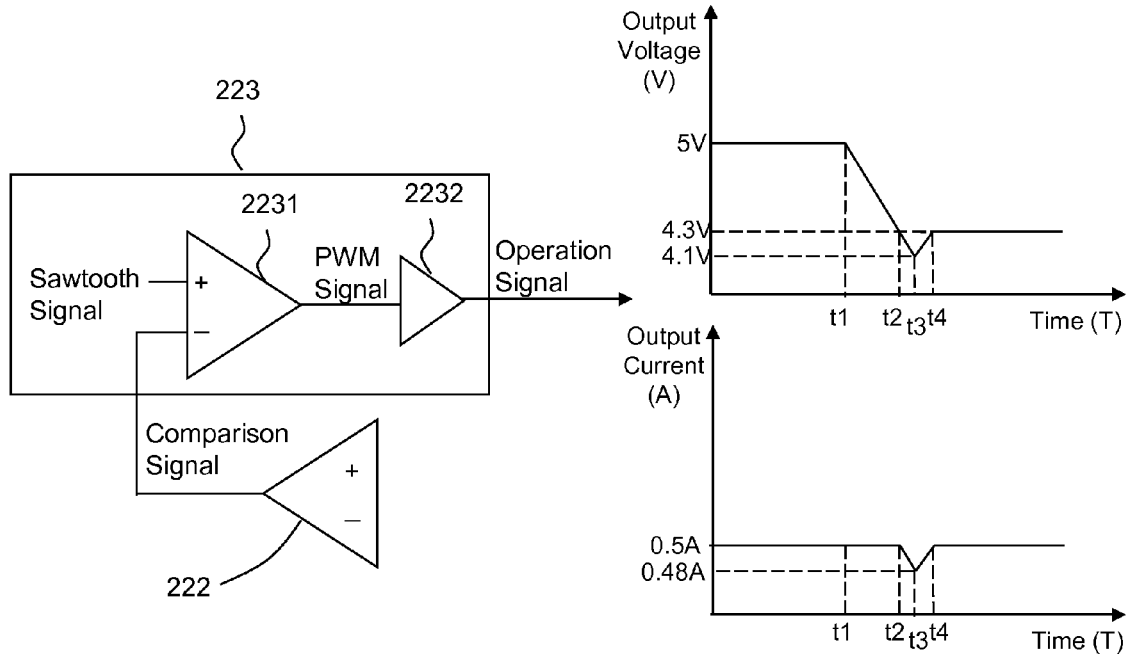
Fig. 4
Fig. 5B
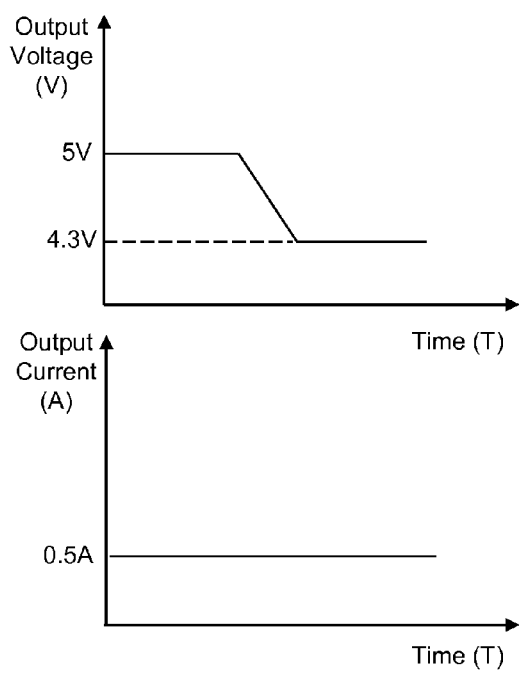
Fig. 5A
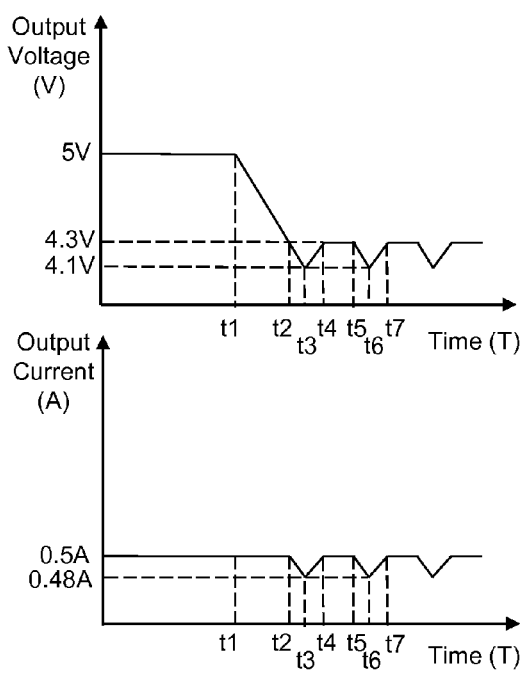
Fig. 5C

VOLTAGE REGULATOR, AND CONTROL CIRCUIT AND CONTROL METHOD THEREOF

BACKGROUND OF THE INVENTION

1. Field of Invention

The present invention relates to a voltage regulator and a control circuit and a control method of a voltage regulator; particularly, it relates to such voltage regulator and control circuit and control method capable of adjusting the output voltage to reduce the power consumption while maintaining a stable supply of output current.

2. Description of Related Art

The development of the technology of USB On-the-Go (USB OTG) makes consumers more easily connect different types of portable devices together. USB OTG enables the device equipped with such technology to act as a host and provide power to other portable electronic devices connected to it while operating itself. The OTG host usually operates and provides power by one single lithium battery with voltage ranging from 3V to 4.2V.

Please refer to FIG. 1, which shows a schematic diagram of a conventional voltage regulator 100. When the OTG host supplies power to other portable devices, the voltage regulator 100 included in the OTG host converts an input voltage Vin supplied from a battery 10 to an output voltage Vout. For example, a lower input voltage Vin (e.g., 3V) is converted to a higher output voltage Vout (e.g., 5V) so that the output voltage Vout of 5V is supplied to a load 19. The load 19 can be, for example but not limited to, a rechargeable battery of another portable electronic device. As shown in FIG. 1, the voltage regulator 100 comprises a power stage 11, a control circuit 12 and a voltage detection circuit 13. The voltage detection circuit 13 can be, for example but not limited to, a voltage divider circuit which generates a feedback signal related to the output voltage. The power stage 11 controls at least one power switch (not shown) included therein in response to an operation signal to convert the input voltage Vin at the input terminal IN to the output voltage Vout at the output terminal OUT.

In this prior art, the output voltage Vout is a constant and is invariable. However, the load 19 may only require a stable supply of current but does not require the supply of a high voltage, so the supply of a high voltage may lead to unnecessary power consumption. For example, the load 19 may only require a stable current of 0.5 A, and an output voltage Vout of 4.3V is sufficient to provide such current and maintain the normal operation of the load 19. Thus, when the voltage regulator 100 provides an output voltage Vout of 5V to the load 19, there will be unnecessary power consumption of 0.35 watt ((5V−4.3V)×0.5 A=0.35 watt). Therefore, it is desired to reduce the unnecessary power consumption in the prior art.

In view of the above, to overcome the drawbacks in the prior art, the present invention proposes a voltage regulator and a control circuit and a control method of a voltage regulator, which is capable of adjusting the level of the output voltage depending on the load's practical needs to avoid unnecessary power consumption, and is capable of adjusting the output voltage in response to the status of the output current to optimize the operation of the voltage regulator.

SUMMARY OF THE INVENTION

A first objective of the present invention is to provide a voltage regulator.

A second objective of the present invention is to provide a control circuit of a voltage regulator.

A third objective of the present invention is to provide a control method of a voltage regulator.

To achieve the above and other objectives, from one perspective, the present invention provides a voltage regulator, comprising: a power stage for converting an input voltage to an output voltage according to an operational signal and providing an output current; and a control circuit for generating the operational signal, comprising: a comparing circuit for comparing a signal related to the output voltage with an adjustable reference voltage to generate a comparison signal; an operation signal generation circuit for generating the operational signal in response to the comparison signal; and a reference voltage adjusting circuit for adjusting the adjustable reference voltage according to the output current.

From another perspective, the present invention provides a voltage regulator, comprising: a variable charge pump with adjustable output to input voltage ratio, for converting an input voltage to an output voltage according to an operational signal and providing an output current; and a control circuit for generating the operational signal, comprising: a ratio adjusting circuit for generating an adjustment signal according to the output current; and an operation signal generation circuit for generating the operational signal in response to the adjustment signal; wherein the adjustment signal adjusts the output to input voltage ratio of the charge pump.

From yet another perspective, the present invention provides a control circuit of a voltage regulator, for generating and providing an operational signal to a power stage included in the voltage regulator to convert an input voltage to an output voltage at an output terminal and provide an output current, the control circuit comprising: a comparing circuit for comparing a signal related to the output voltage with an adjustable reference voltage to generate a comparison signal; an operation signal generation circuit for generating the operational signal in response to the comparison signal; and a reference voltage adjusting circuit for adjusting the adjustable reference voltage according to the output current.

In one embodiment, the reference voltage adjusting circuit adjusts the adjustable reference voltage and senses the output current, and when the adjustment of the adjustable reference voltage causes the output current to change, the adjustable reference voltage is set back to a value which does not change the output current.

In one embodiment, the reference voltage adjusting circuit adjusts the adjustable reference voltage by a one-time adjustment mode, a continuous adjustment mode or a periodical adjustment mode.

In one embodiment, the comparing circuit is an error amplifier or a comparator.

From still another perspective, the present invention provides a control method of a voltage regulator, comprising the steps of: converting an input voltage to an output voltage and providing an output current; sensing the output current; reducing the output voltage; and when the reduction of the output voltage causes the output current to change, setting the output voltage back to a value which does not change the output current.

In one embodiment, the step of reducing the output voltage includes a one-time adjustment mode, a continuous adjustment mode or a periodical adjustment mode.

In one embodiment, the step of converting the input voltage to the output voltage includes: comparing a signal related to the output voltage with an adjustable reference voltage to determine a level of the output voltage; and the step of reducing the output voltage includes: adjusting the reference voltage.

In one embodiment, the step of converting the input voltage to the output voltage includes: converting the input voltage to the output voltage by a variable charge pump with adjustable output to input voltage ratio; and the step of reducing the output voltage includes: adjusting the output to input voltage ratio of the variable charge pump.

The objectives, technical details, features, and effects of the present invention will be better understood with regard to the detailed description of the embodiments below, with reference to the attached drawings.

BRIEF DESCRIPTION OF THE DRAWINGS

FIG. 4 shows an embodiment of the operation signal generation circuit of the present invention.

FIGS. 5A-5C show several embodiments for adjusting the reference voltage (which correspondingly adjusts the output voltage)

DESCRIPTION OF THE PREFERRED EMBODIMENTS

Figure 1:
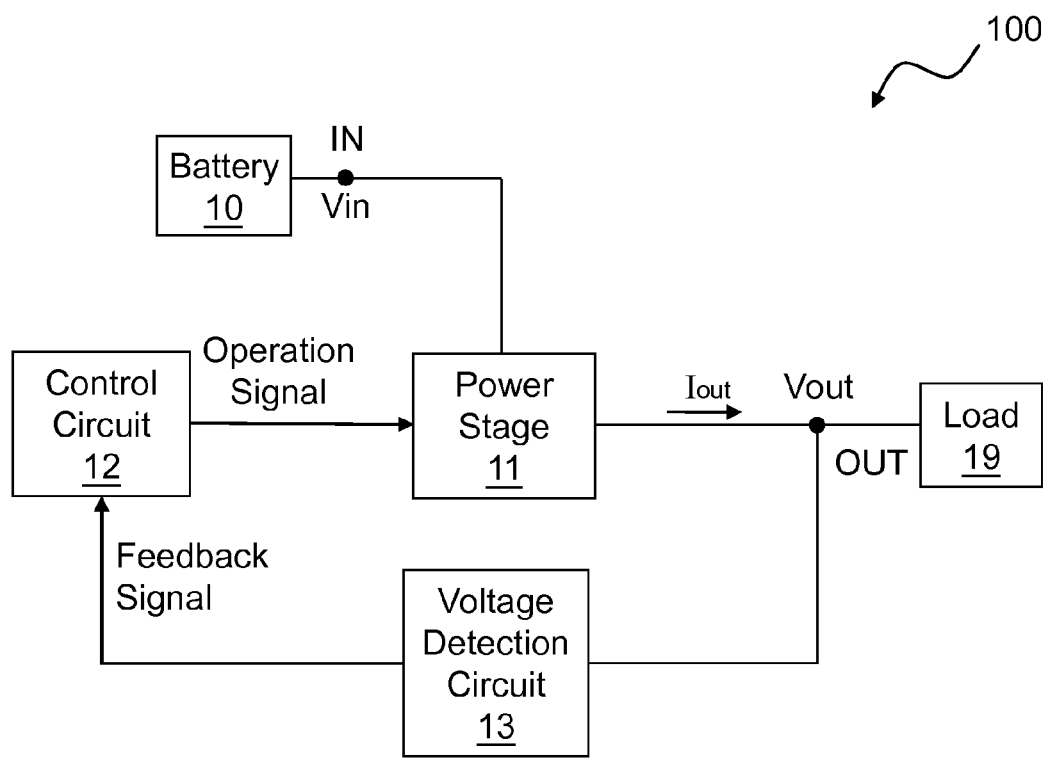
FIG. 1 shows a schematic diagram of a conventional voltage regulator.
Figure 2:
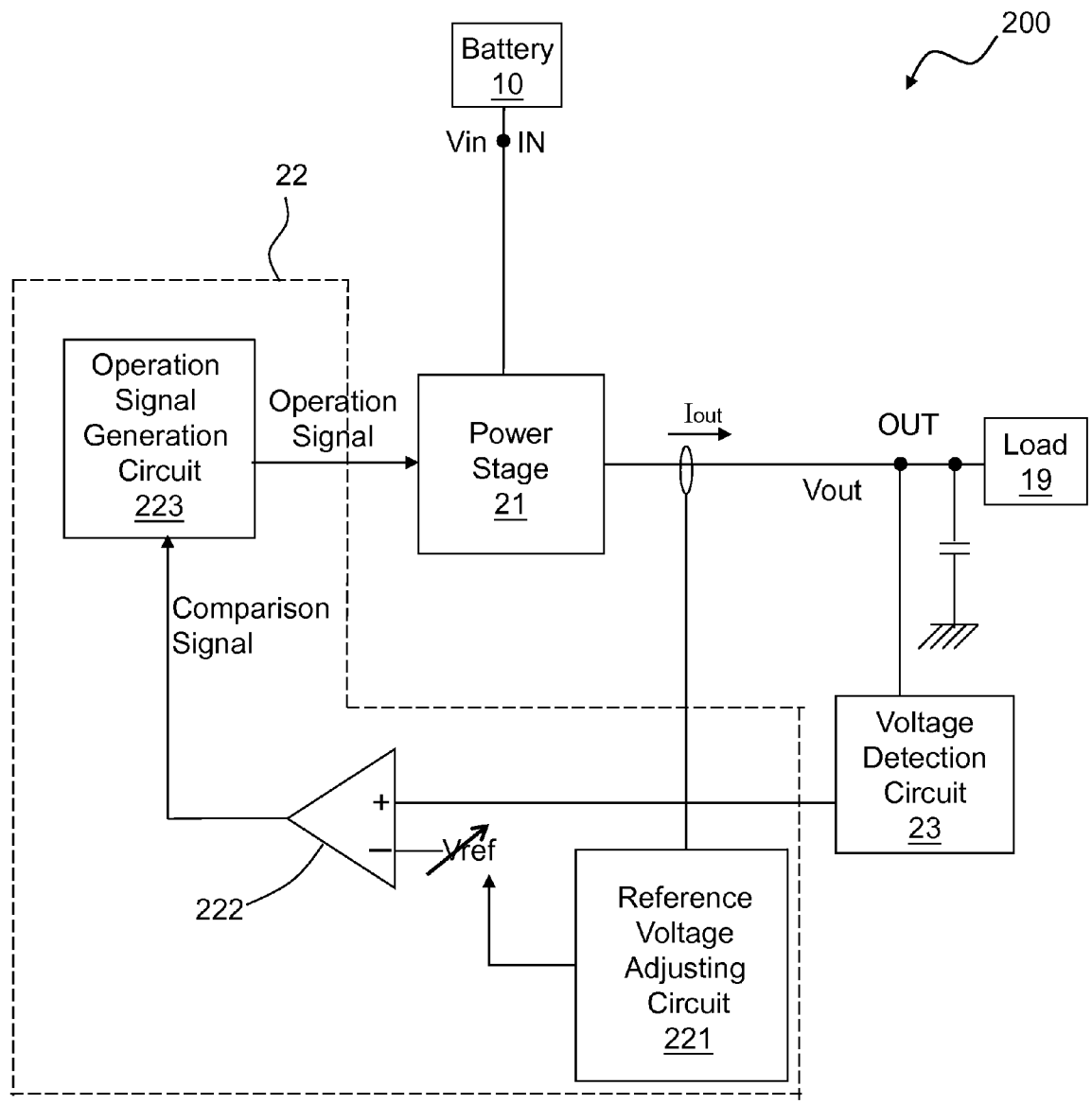
FIG. 2 shows a schematic diagram of a voltage regulator according to a first embodiment of the present invention.
Figure 3A:
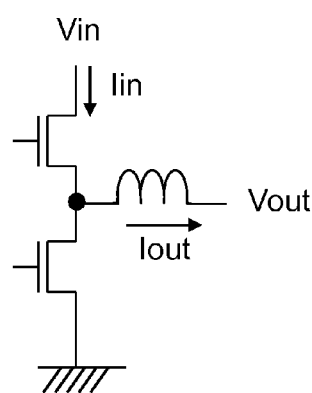
FIGS. 3A-3H show synchronous and asynchronous buck, boost, inverting and buck-boost power stage circuits, respectively.
Figure 3B:
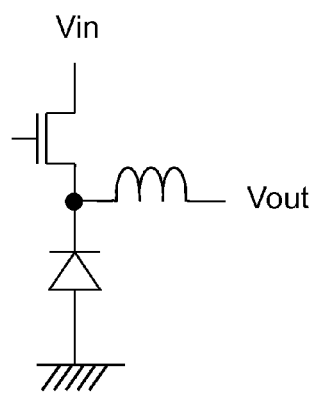
Figure 3C:
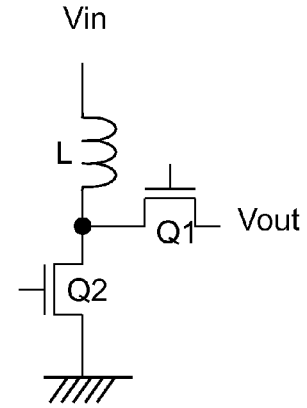
Figure 3D:
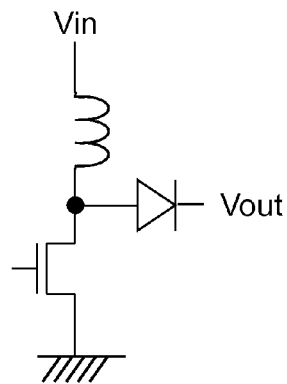
Figure 3E:
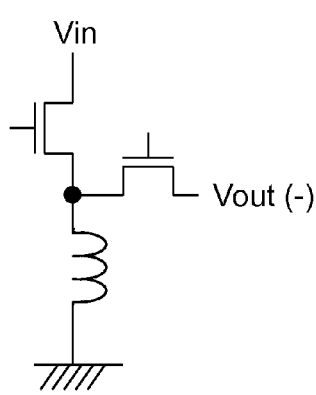
Figure 3F:
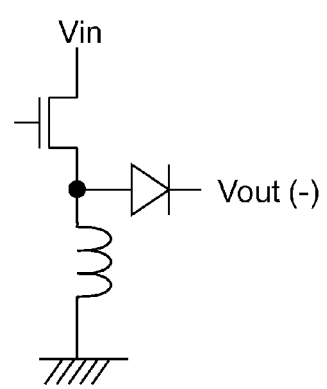
Figure 3G:
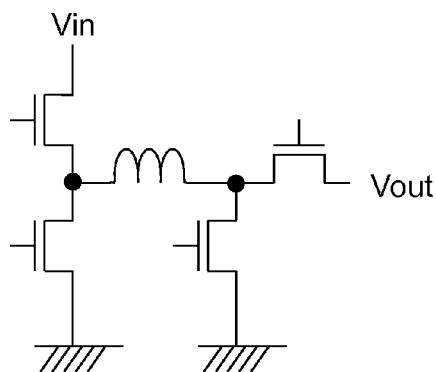
Figure 3H:
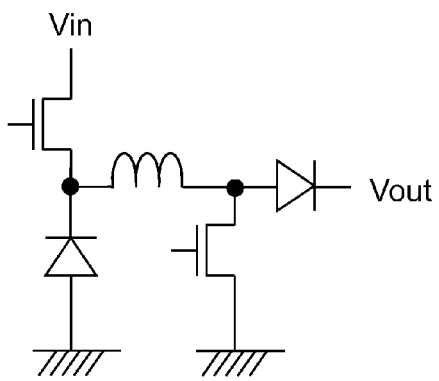

Please refer to FIG. 2, which shows a schematic diagram of a voltage regulator according to a first embodiment of the present invention. The voltage regulator 200 of this embodiment comprises a power stage 21 and a control circuit 22, and may also comprise a voltage detection circuit 23 depending on practical needs. The voltage detection circuit 23 can be, for example but not limited to, a voltage divider circuit. If the control circuit 22 can directly receive the output voltage Vout as the feedback signal, the voltage detection circuit 23 can be omitted. The power stage 21 controls at least one power switch (not shown) included therein in response to an operation signal to convert an input voltage Vin supplied from a battery 10 at the input terminal IN to the output voltage Vout at the output terminal OUT and provide output current Iout to a load 19. Depending on the relationship between the input voltage Vin and the output voltage Vout, the power stage 21 can be synchronous or asynchronous buck, boost, inverting or buck-boost power stage circuits, as shown in FIGS. 3A-3H. Please refer again to FIG. 2. The control circuit 22 includes a reference voltage adjusting circuit 221, a comparing circuit 222 and an operation signal generation circuit 223. The comparing circuit 222 compares a signal related to the output voltage Vout (e.g., the output voltage Vout itself or its divided voltage) with an adjustable reference voltage Vref to generate and deliver a comparison signal to the operation signal generation circuit 223. The comparing circuit 222 can be a digital comparator or an analog error amplifier, depending on the design of the operation signal generation circuit 223. The operation signal generation circuit 223 generates the operational signal in response to the comparison signal. The reference voltage adjusting circuit 221 adjusts the reference voltage Vref according to the output current Iout. Because the reference voltage Vref determines the level where the output voltage Vout is as the circuit is balanced, the present invention can adjust the reference voltage Vref according to the status of the output current Iout, to optimize the output voltage Vout and reduce the unnecessary power consumption at the output terminal OUT while the output current Iout and the load operation are not affected. There are variable ways for adjusting the reference voltage Vref (i.e., adjusting the output voltage Vout) and they will be discussed later.

Please refer to FIG. 4, which shows an embodiment of the operation signal generation circuit 223. If the comparing circuit 222 is an error amplifier and the comparison signal generated by such error amplifier is an analog error amplification signal, the operation signal generation circuit 223 can comprise, for example, a PWM signal generation circuit 2231 and a driver gate 2232. The PWM signal generation circuit 2231 compares the error amplification signal generated by the comparing circuit 222 with a sawtooth signal to generate a PWM signal, and the driver gate 2232 converts the PWM signal to an operation signal with a proper level to drive the power switch (not shown) in the power stage 21. The sawtooth signal can can have a fixed frequency or a variable frequency, and it can be generated within the circuit or generated according to the current in the power stage 21 or the output current Iout. Certainly, it should be understood that the embodiment of the operation signal generation circuit 223 shown in FIG. 4 is for illustrative purpose, but not for limiting the scope of the present invention. Other modifications and variations are also practicable. For example, if the level of the output signal of the PWM signal generation circuit 2231 has a sufficient level to drive the power stage 21, the driver gate 2232 can be omitted. For another example, if the comparing circuit 222 is a digital comparator and the comparison signal generated by such digital comparator is a digital signal, the operation signal generation circuit 223 can generate a single pulse as an operation signal, in response to the level of the digital signal. In addition to the above-mentioned examples, other modifications and variations of the operation signal generation circuit 223 are also practicable as long as it can generate a desired operation signal to control the power stage 21.

Figure 6A:
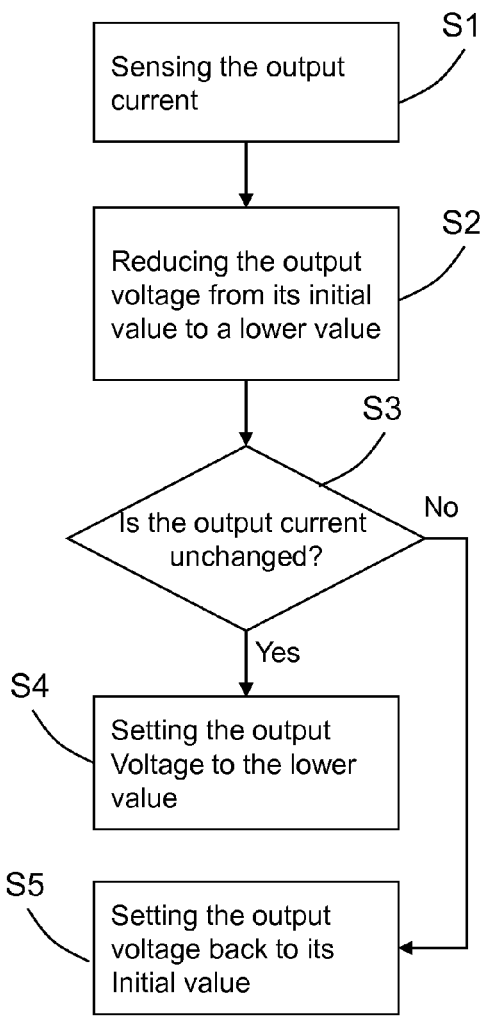
FIGS. 6A-6C are flow charts corresponding to FIGS. 5A-5C, respectively.
Figure 6B:
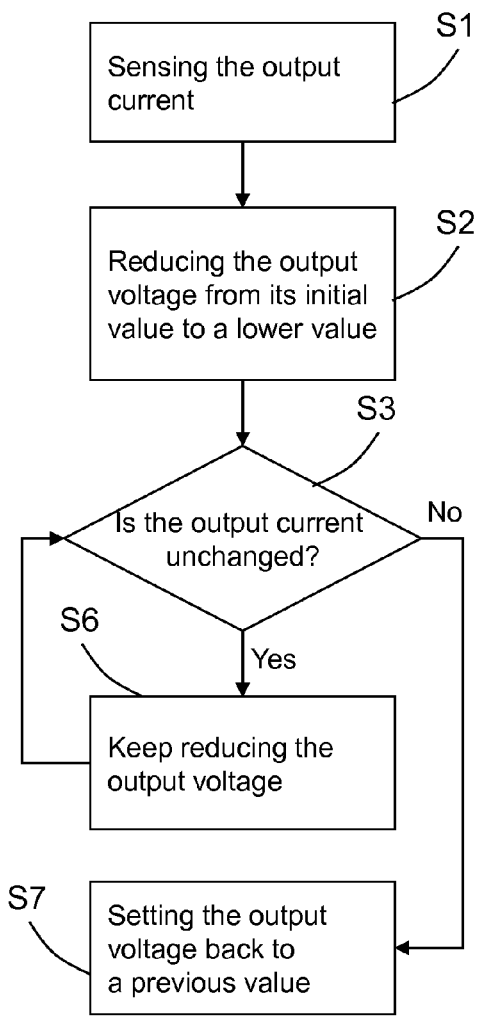
Figure 6C:
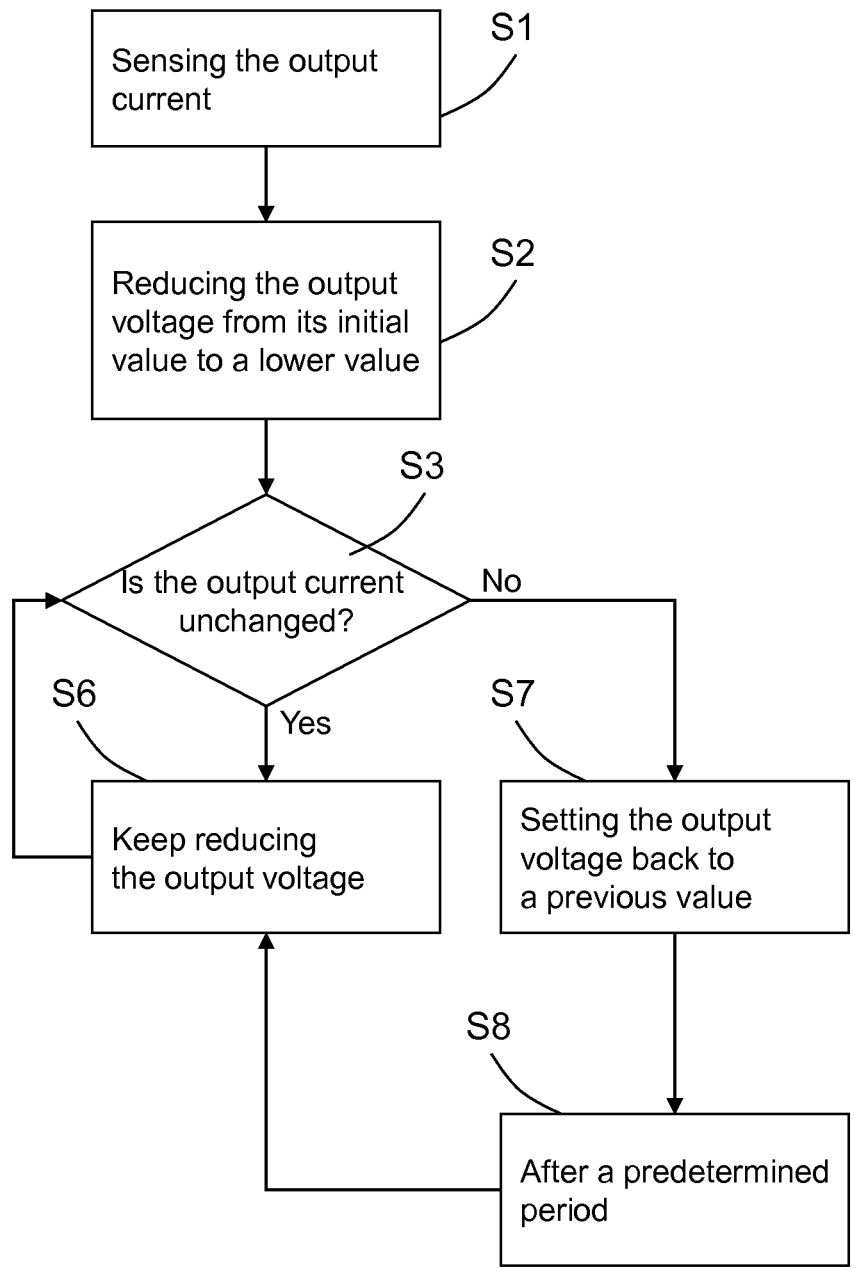

Please refer to FIGS. 5A-5C in conjugation with FIGS. 6A-6C, which show several embodiments for adjusting the reference voltage Vref (which correspondingly adjusts the output voltage Vout). The values of the voltage or current described in the embodiments below are for illustrative purpose only, but not for limiting the scope of the present invention.

A first embodiment for adjusting the reference voltage Vref will be described in conjugation with FIG. 5A and FIG. 6A. In the step of S1, this embodiment senses the output current. In this embodiment, the output current is assumed to be, for example, 0.5 A, and the initial output voltage is assumed to be, for example, 5V. In the step of S2, this embodiment reduces the reference voltage Vref to a lower value, and the output voltage is correspondingly reduced from its initial value of 5V to a lower value, for example, 4.3V. In this embodiment, the reference voltage Vref has only two available settings, respectively corresponding to the output voltage of 5V and 4.3V. In the step of S3, this embodiment checks whether the output current is unchanged. If the output current is unchanged, it indicates that reducing the output voltage to 4.3V does not affect the operation of the load. Thus, the output voltage is set to be 4.3V (the step of S4). If the output current is found to be changed in the step of S3, it indicates that reducing the output voltage to 4.3V may affect the operation of the load. Under such circumstance, the output voltage is set back to 5V (the step of S5). This first embodiment can be regarded as an embodiment of "one-time adjustment mode".

A second embodiment for adjusting the reference voltage Vref will be described in conjugation with FIG. 5B and FIG. 6B. The steps of S1-S3 of this embodiment are similar to those of the first embodiment. This embodiment is different from the first embodiment in that the reference voltage Vref has multiple available settings instead of only two, and the multiple available settings can be stepwise or continuously adjustable. During the period from the time point t1 to the time point t2, this embodiment keeps adjusting the reference voltage Vref and the output voltage is also correspondingly reduced from its initial value of 5V to a lower value of 4.3V. During this process, the output current remains unchanged (the steps of S3 and S6). Until the time point of t3, the output voltage is reduced to 4.1V where the output current is found to be changed, which indicates that reducing the output voltage to 4.1V may affect the operation of the load. Thus, the reference voltage Vref is set back to a previous value, and the output voltage is correspondingly set back to a previous value, for example, 4.3V (the steps of S3 and S7; the time point of t4). This second embodiment can be regarded as an embodiment of "continuous adjustment mode".

In this second embodiment for adjusting the reference voltage Vref, if the reference voltage Vref is adjusted to a limit and can not be adjusted beyond, while the output current still remains unchanged, the situation may be similar to FIG. 5A.

A third embodiment for adjusting the reference voltage Vref will be described in conjugation with FIG. 5C and FIG. 6C. The steps of S1-S3 and S6-S7 of this embodiment are similar to those of the second embodiment. Thus, the adjustment from the time point of t1 to the time point of t4 in this embodiment is also similar to that in the second embodiment. This embodiment is different from the second embodiment in that after the output voltage is set to a value which does not change the output current, this embodiment periodically checks whether the output voltage can be further reduced (the step of S6; the time points of t5-t6) every predetermined period (the step of S8; the time period from the time point of t4 to the time point of t5). If the output current is found to be changed (the step of S3; the time points of t6), the reference voltage Vref is again set back to a previous value and the output voltage is correspondingly set back to a previous value (the step of S7; the time points of t7). This third embodiment can be regarded as an embodiment of "periodical adjustment mode".

In view of the above, the present invention can reduce the output voltage Vout while still supplying sufficient output current to maintain the operation of the load 19, so that unnecessary power consumption is avoided and the operation of the voltage regulator 200 is optimized.

Figure 7:
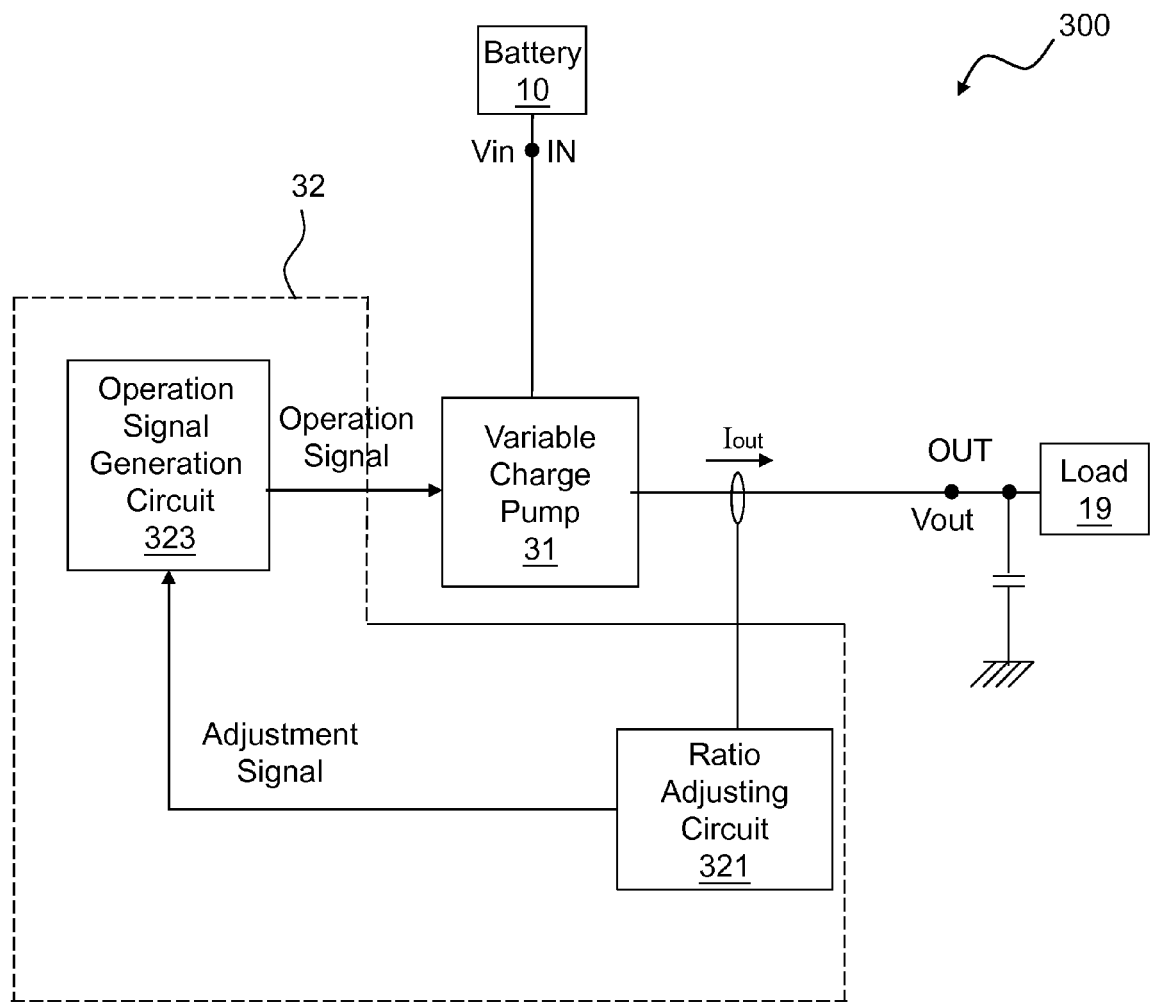
FIG. 7 shows a schematic diagram of a voltage regulator according to a second embodiment of the present invention.

The idea of the present invention is not necessarily limited to be applied in the power stage circuits shown in FIGS. 3A-3H; it can also be applied in a charge pump. Please refer to FIG. 7, which shows a schematic diagram of a voltage regulator according to a second embodiment of the present invention. The voltage regulator 300 of this embodiment comprises a variable charge pump 31 (i.e., a charge pump with an adjustable output to input voltage ratio) and a control circuit 32. The control circuit 32 comprises a ratio adjusting circuit 321 and an operation signal generation circuit 323. The operation signal generation circuit 323 generates an operational signal to control the operation of the variable charge pump 31, so that an input voltage Vin is converted to an output voltage Vout. The ratio adjusting circuit 321 generates an adjustment signal according to the output current Iout to control the operation signal generation circuit 323. Accordingly, the operation signal adjusts the output to input voltage ratio of the variable charge pump 31, and the output voltage Vout is correspondingly adjusted. The voltage regulator 300 of this embodiment can also achieve the objective of the present invention. In other words, the voltage regulator 300 of this embodiment can reduce the output voltage Vout while still supplying sufficient output current to maintain the operation of the load 19, so that unnecessary power consumption is avoided and the operation of the voltage regulator 300 is optimized. The variable charge pump 31 with adjustable output to input voltage ratio can generate different output voltages in response to the same input voltage, which is well-known to those skilled in the art and is therefore not redundantly repeated here. For example, please refer to U.S. Publication No. 2009/0219078 filed by the assignee of the present invention.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, a device which does not substantially influence the primary function of a signal can be inserted between any two devices in the shown embodiments, such as a switch. In view of the foregoing, the spirit of the present invention should cover all such and other modifications and variations, which should be interpreted to fall within the scope of the following claims and their equivalents.

What is claimed is:

1. A control method of a voltage regulator, comprising the steps of:
   converting an input voltage to an output voltage and providing an output current;
   sensing the output current; reducing the output voltage; and
   when the reduction of the output voltage causes the output current to drop, setting the output voltage back to a value which does not change the output current, to set the output voltage to a lowest level capable of maintaining a stable supply of the output current,
   wherein the step of converting the input voltage to the output voltage includes: comparing a signal related to the output voltage with an adjustable reference voltage to determine a level of the output voltage; and the step of reducing the output voltage includes: adjusting the adjustable reference voltage.

2. The control method of claim 1, wherein the step of reducing the output voltage includes a one-time adjustment mode, a continuous adjustment mode or a periodical adjustment mode.

3. A voltage regulator, comprising:
   a power stage for converting an input voltage to an output voltage according to an operational signal and providing an output current; and
   a control circuit for generating the operational signal, comprising:
   a comparing circuit for comparing a signal related to the output voltage with an adjustable reference voltage to generate a comparison signal;

an operation signal generation circuit for generating the operational signal in response to the comparison signal; and a reference voltage adjusting circuit for adjusting the adjustable reference voltage according to the output current, wherein the reference voltage adjusting circuit adjusts the adjustable reference voltage to reduce the output voltage and senses the output current, and when the adjustment of the adjustable reference voltage causes the output current to drop, the adjustable reference voltage is set back to a value which does not change the output current, to set the output voltage to a lowest level capable of maintaining a stable supply of the output current.

4. The voltage regulator of claim 3, wherein the reference voltage adjusting circuit adjusts the adjustable reference voltage by a one-time adjustment mode, a continuous adjustment mode or a periodical adjustment mode.

5. The voltage regulator of claim 3, wherein the comparing circuit is an error amplifier or a comparator.

6. A control circuit of a voltage regulator, for generating and providing an operational signal to a power stage included in the voltage regulator to convert an input voltage to an output voltage at an output terminal and provide an output current, the control circuit comprising:

a comparing circuit for comparing a signal related to the output voltage with an adjustable reference voltage to generate a comparison signal;

an operation signal generation circuit for generating the operational signal in response to the comparison signal; and a reference voltage adjusting circuit for adjusting the adjustable reference voltage according to the output current, wherein the reference voltage adjusting circuit adjusts the adjustable reference voltage to reduce the output voltage and senses the output current, and when the adjustment of the adjustable reference voltage causes the output current to drop, the adjustable reference voltage is set back to a value which does not change the output current, to set the output voltage to a lowest level capable of maintaining a stable supply of the output current.

7. The voltage regulator of claim 6, wherein the reference voltage adjusting circuit adjusts the adjustable reference voltage by a one-time adjustment mode, a continuous adjustment mode or a periodical adjustment mode.

8. The voltage regulator of claim 6, wherein the comparing circuit is an error amplifier or a comparator.

* * * * *